United States Patent
Baumgartner et al.

(10) Patent No.: US 6,582,297 B2
(45) Date of Patent: Jun. 24, 2003

(54) LIVESTOCK FACILITY VENTILATION EXHAUST AIR DUST REMOVAL SYSTEM

(75) Inventors: John W. Baumgartner, Olivia, MN (US); Mark K. Kubesh, Olivia, MN (US)

(73) Assignee: Baumgartner Environics, Inc., Olivia, MN (US)

(*) Notice: Subject to any disclaimer, the term of this patent is extended or adjusted under 35 U.S.C. 154(b) by 0 days.

(21) Appl. No.: 10/254,152

(22) Filed: Sep. 24, 2002

(65) Prior Publication Data

US 2003/0060155 A1 Mar. 27, 2003

Related U.S. Application Data

(60) Provisional application No. 60/325,125, filed on Sep. 25, 2001.

(51) Int. Cl.$^7$ ................................................. F24F 7/007

(52) U.S. Cl. ...................... 454/356; 454/358; 454/368; 55/DIG. 30

(58) Field of Search ................................ 454/341, 356, 454/358, 367, 368; 55/DIG. 30

(56) References Cited

U.S. PATENT DOCUMENTS

| | | | | |
|---|---|---|---|---|
| 4,184,538 A | * | 1/1980 | Rauenhorst | 165/66 |
| 5,336,131 A | * | 8/1994 | Crider et al. | 454/238 |
| 5,492,082 A | * | 2/1996 | Krevinghaus et al. | 119/448 |

OTHER PUBLICATIONS

From Bottcher, Robert W. (et. al.) "Field and Model Evaluations of Windbreak Walls for Modifying Emissions from Tunnel Ventilated Swine Buildings" Presented at Jul., 1998 ASAE Annual Meeting, Paper No. 984071. ASAE, 2950 Niles Rd., St. Joseph, MI 49085–9659 USA.

Premium Standard Farms "Environmental Work Plan" Premium Standard Farms, Inc. Nov. 1, 1999 (Revised Apr. 19, 2000); Published at http://www.psfarms.com/1999wp.pdf; USA.

Premium Standard Farms "Technology: Reduce, Reuse, Recycle" Premium Standard Farms, Inc.—date unknown—published at http://www.psfarms.com/technology.html, USA.

* cited by examiner

Primary Examiner—Derek Boles
(74) Attorney, Agent, or Firm—Gray, Plant, Mooty, Mooty & Bennett, P.A.

(57) ABSTRACT

A livestock facility exhaust system to remove a majority of the dust and other such odorous airborne particulate material from air exhausted by power ventilation equipment from a livestock confinement building and without a significant increase in static pressure within the ventilation system. This is accomplished by a free standing enclosure of high strength air permeable material supported by a hoop structure around the exhaust end of the containment building of the livestock facility. Exhausted air enters the enclosure and is temporarily contained therein. Air circulates around impaction surfaces in the enclosure that promote precipitation of airborne particulates from the air stream. A discharge opening is located at or near the top of the enclosure. Exhaust air rid of most of the airborne particulates moves upward and out through the opening. The enclosure also serves to deflect outside wind from the fan orifices which helps to maintain fan performance.

22 Claims, 6 Drawing Sheets

LIVESTOCK FACILITY VENTILATION EXHAUST AIR DUST REMOVAL SYSTEM

CROSS REFERENCE TO RELATED APPLICATION

This application claims the benefit of U.S. Provisional Application Ser. No. 60/325,125 filed Sep. 25, 2001.

BACKGROUND OF THE INVENTION

Livestock is housed in buildings that need to be ventilated, either naturally or through the use of power equipment. Typically, air is exhausted from power ventilated livestock facilities by an appropriate number of 24 to 60 inch, high volume, electrically powered and controlled fans. This provides the appropriate air exchange rate for the animals housed inside the facility in accordance with environmental conditions present. In general, cooler conditions warrant low or minimum ventilation, just to keep air freshened, while warmer weather warrants a much higher ventilation rate to keep animals cool and comfortable. Power ventilation allows air to be pulled in one end or side opening of a building and through the living area of the animals, to be exhausted by the fans at the other end. This creates the air circulation needed.

Odor is inherent in this production system. Odor is generated from the animals, anaerobic degradation and volatilization of manure and urine, and from other sources present. Dust is also produced from sluffed animal dander and movement of feed. Research has shown that dust molecules attract and hold odor molecules such as ammonia, hydrogen sulfide and a wide range of volatile organic compounds.

This system of ventilation effectively removes dust and odors from the living space of animals, creating a better environment within. However air laden with dust and odor is discharged directly to the atmosphere at the fan end of the facility. This often causes a concentrated and objectionable odor plume downwind from these facilities.

SUMMARY OF THE INVENTION

The invention pertains to a livestock facility exhaust system to remove a majority of the dust and other such odorous airborne particulate material from air exhausted by power ventilation equipment from a livestock confinement building and without a significant increase in static pressure within the ventilation system.

It has been theorized that up to 90% of odor molecules exiting livestock production facilities are attached to airborne dust particles. Upon removal of a majority of this airborne material with the disclosed invention, odor release to the atmosphere is significantly reduced with less likelihood that downwind receptors will detect offensive odor.

The purpose of the invention is to substantially reduce the dust and odor discharge from livestock facilities employing power ventilation (as opposed to natural ventilation). This is accomplished by a free standing enclosure of high strength woven synthetic material supported by a hoop structure around the exhaust end of the containment building of the livestock facility. Exhausted air enters the enclosure and is temporarily contained therein. Air circulates around impaction surfaces in the enclosure that promote precipitation of airborne particulates from the air stream. A discharge opening is located at or near the top of the enclosure. Exhaust air rid of most of the airborne particulates moves upward and out through the opening. The enclosure also serves to deflect outside wind from the fan orifices which helps to maintain fan performance.

This structure presents numerous opportunities for removing dust from exhaust air. Dust particles are "scrubbed" from exhaust air by impaction, redirection and vortex forces created by the design of the enclosure and strategically placed impaction surfaces and material.

The free standing enclosure structure can be as wide as the fan wall itself. It typically extends out approximately 14 feet from the building and 10 feet from the fans, and is typically about 7 to 12 feet high at its highest point near the building. The sides of the enclosure extend to the building exterior wall. The bottom perimeter of the structure is enclosed with a flap that lies on the ground and is covered with gravel.

The enclosure defines a chamber that serves as a collection and impaction area. Exhausted air moves from the fan orifice to an area of lower pressure inside of the enclosure. The air slows in this area as it impacts various permeable surfaces, without causing a static pressure increase and subsequent reduction in fan efficiency. The air, once impacting the inner surfaces of the enclosure, is generally directed toward the ground where it tends to stall in the area furthest from the fan in the enclosure. Many dust particles will fall out of suspension at this point. The air stream, following a path of least resistance (and lowest pressure), reverses direction and exits out the opening in the top of the enclosure. Part of the air stream passes through the porous enclosure wall and dust is trapped by the fabric. Periodic rain events clean the fabric of excess dust. A disposable ground mat with dust retention characteristics can be placed on the floor of the structure to allow for the collection, storage and removal of accumulated dust as needed (likely once annually).

At times a "Venturi" effect is created when the ambient wind sweeps over the discharge opening of the enclosure with sufficient speed to create a pressure differential. During such occurrences, air will actually be drawn out of the enclosure.

IN THE DRAWINGS

DESCRIPTION OF A PREFERRED EMBODIMENT

Figure 1:
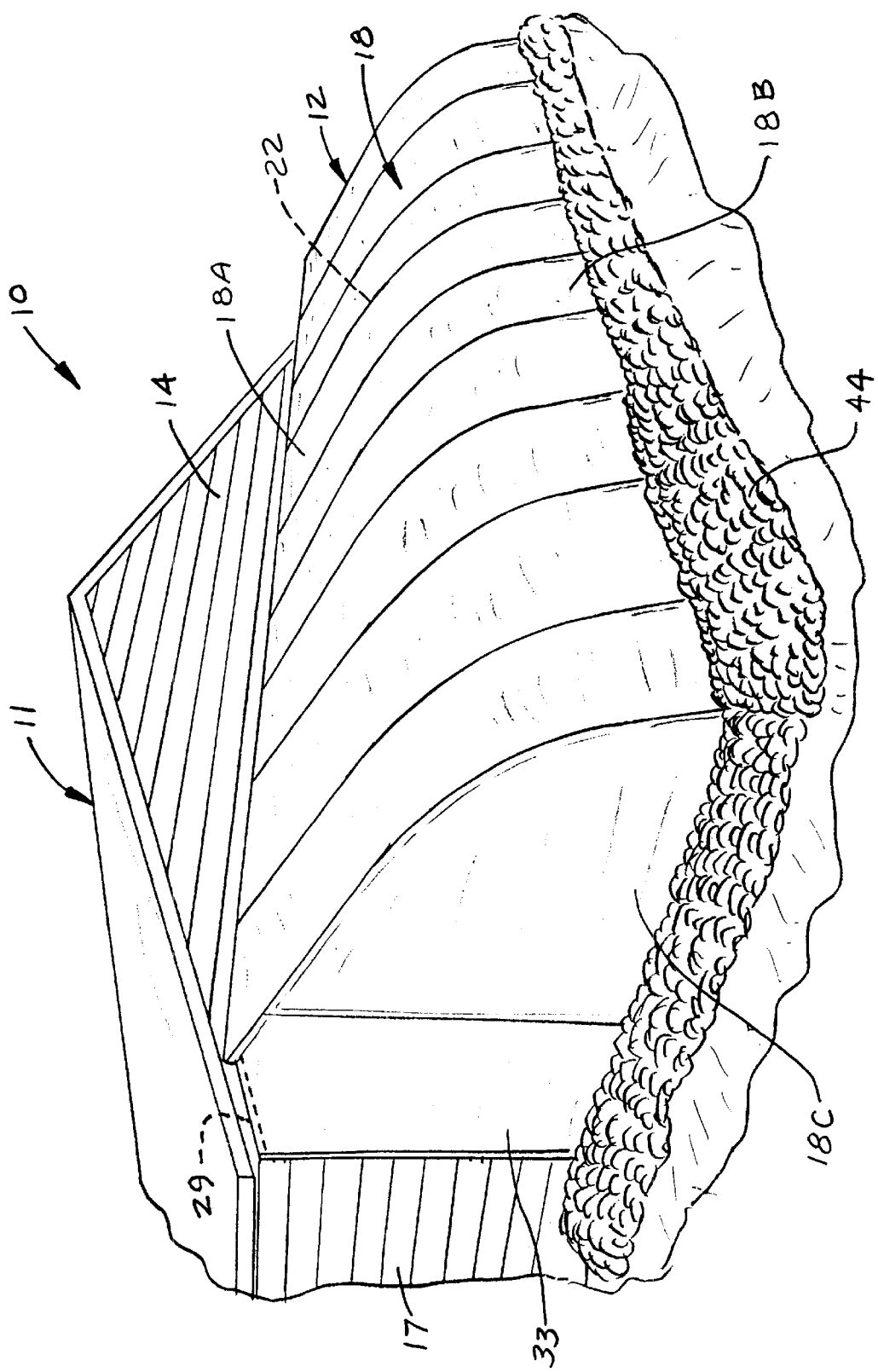
FIG. 1 is a perspective view of an exhaust end of a livestock housing facility containment building having a ventilation exhaust air dust removal enclosure and system according to the invention.
Figure 2:
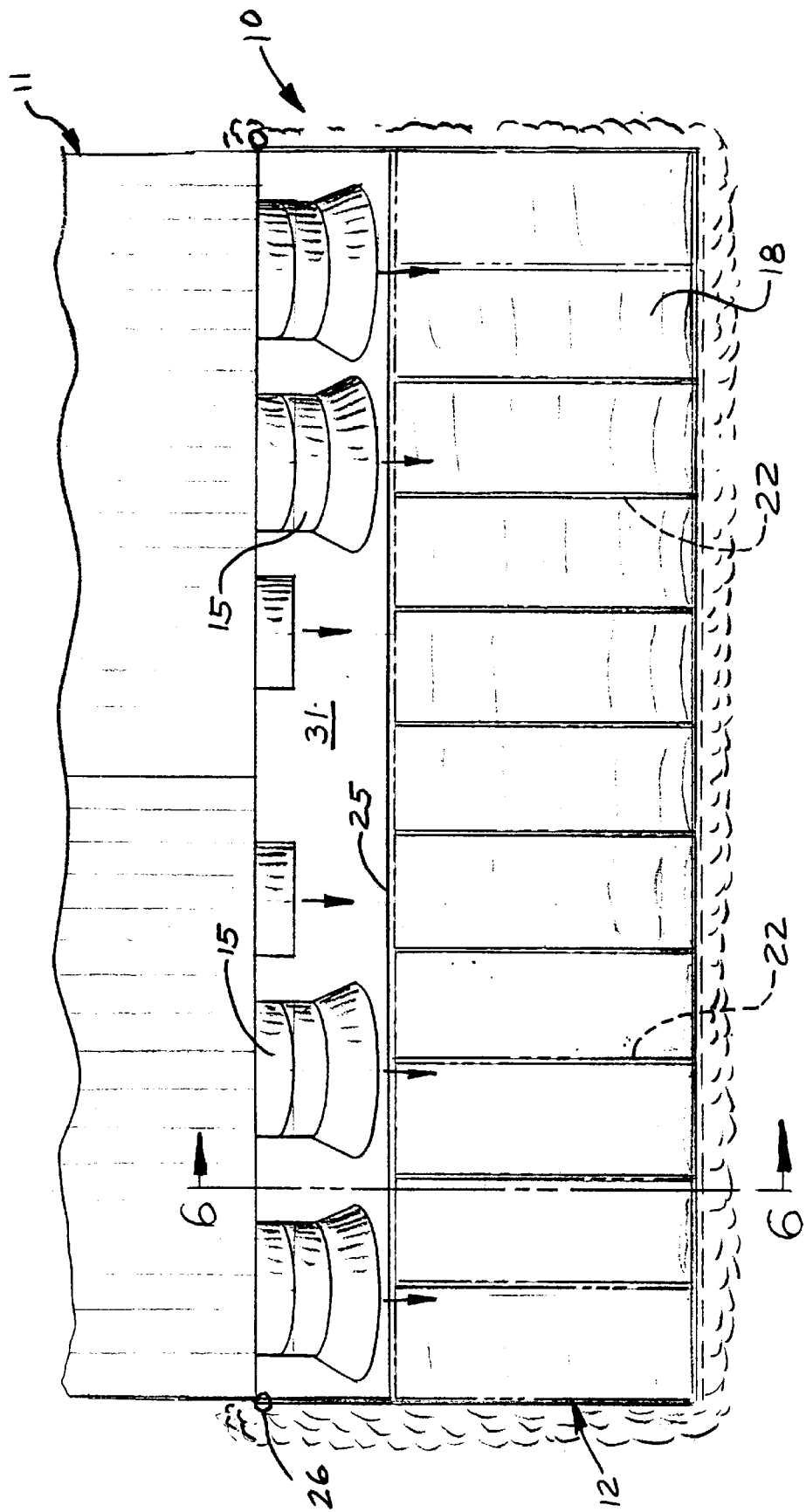
FIG. 2 is a top plan view of the livestock facility and dust removal system of FIG. 1.
Figure 3:
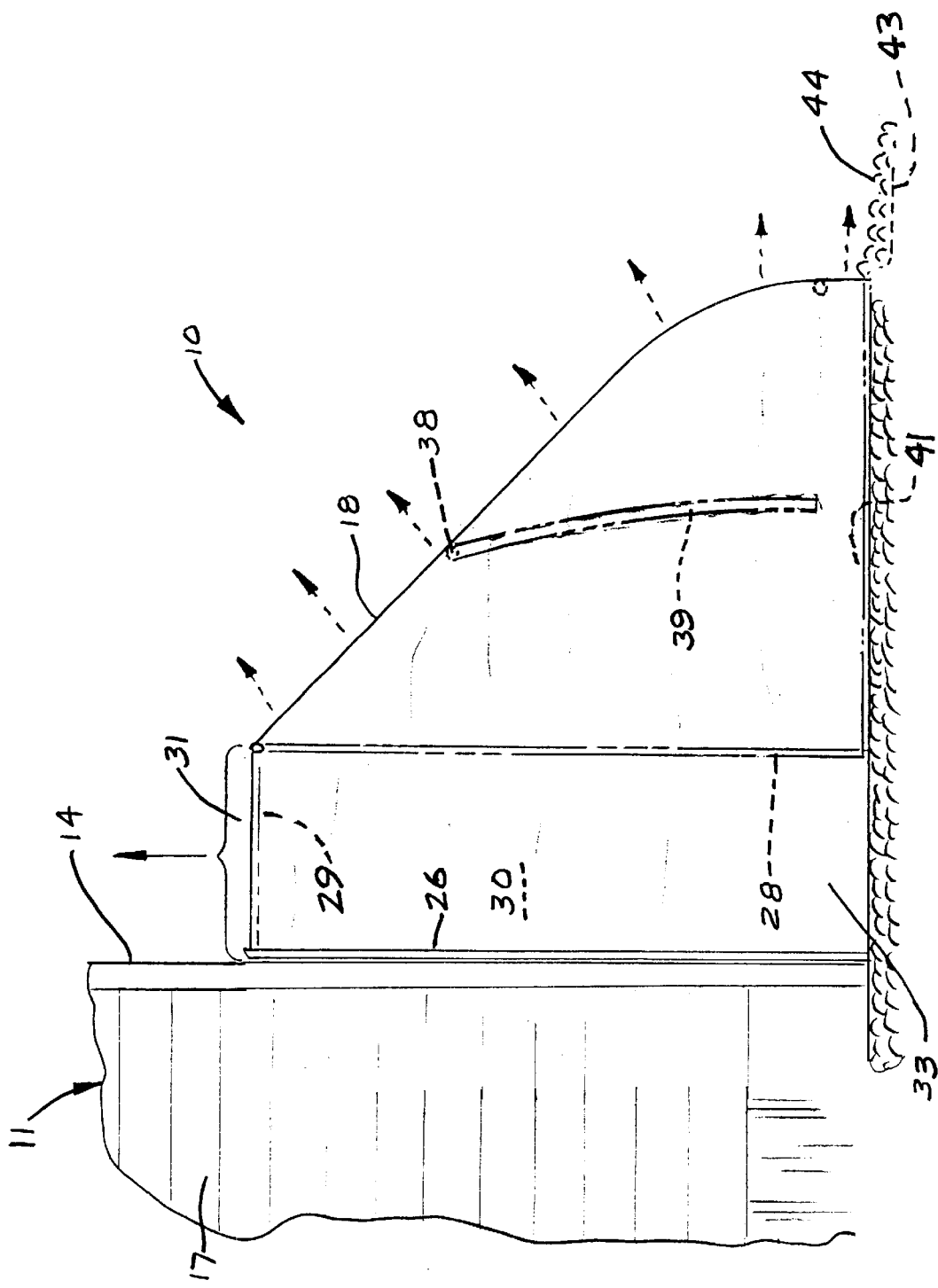
FIG. 3 is a side elevational view of the confinement building and dust removal system of FIG. 1.
Figure 4:
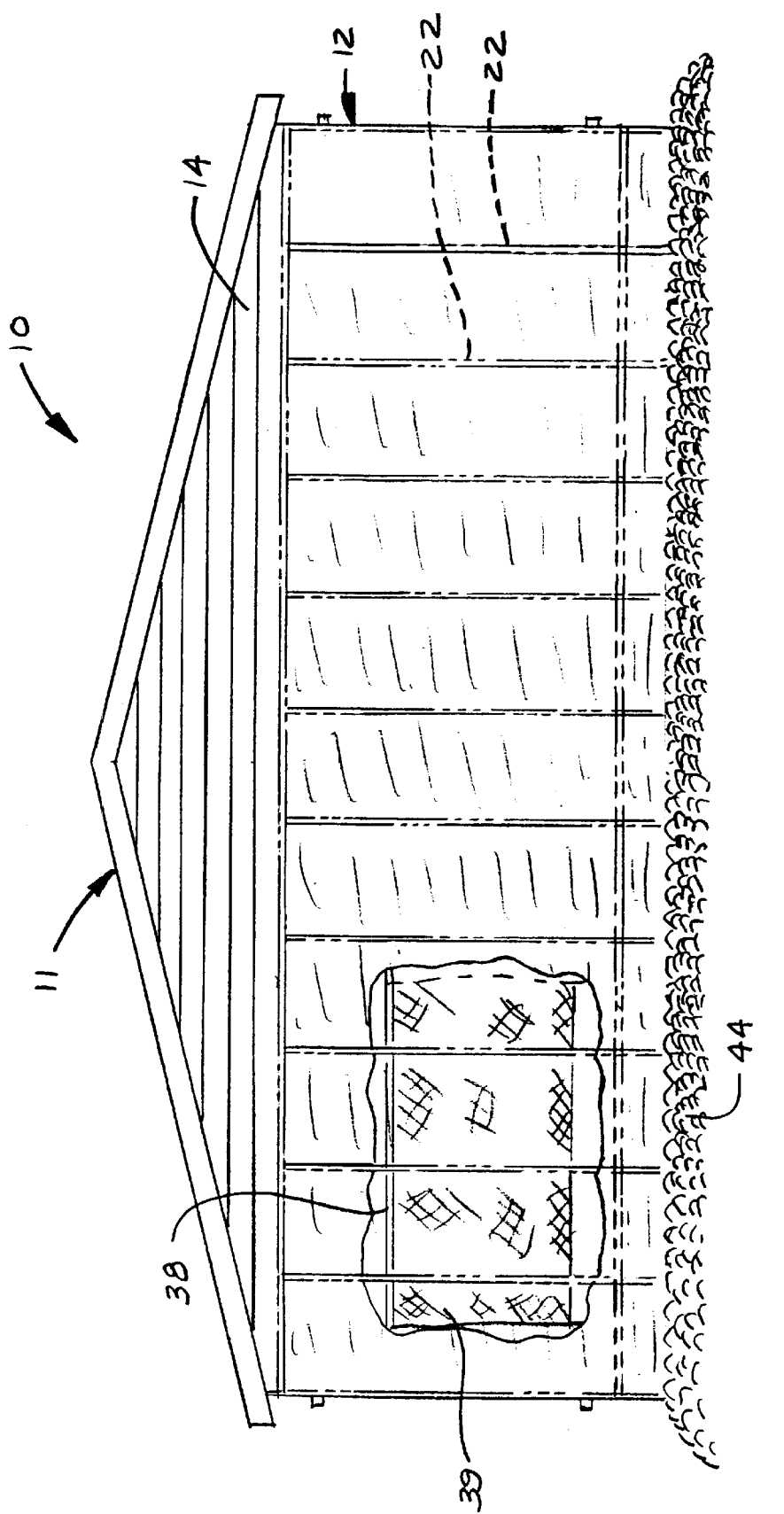
FIG. 4 is an end view of the livestock housing facility and air dust removal system shown in FIG. 1 with a portion of the cover broken away for purposes of illustration.
Figure 5:
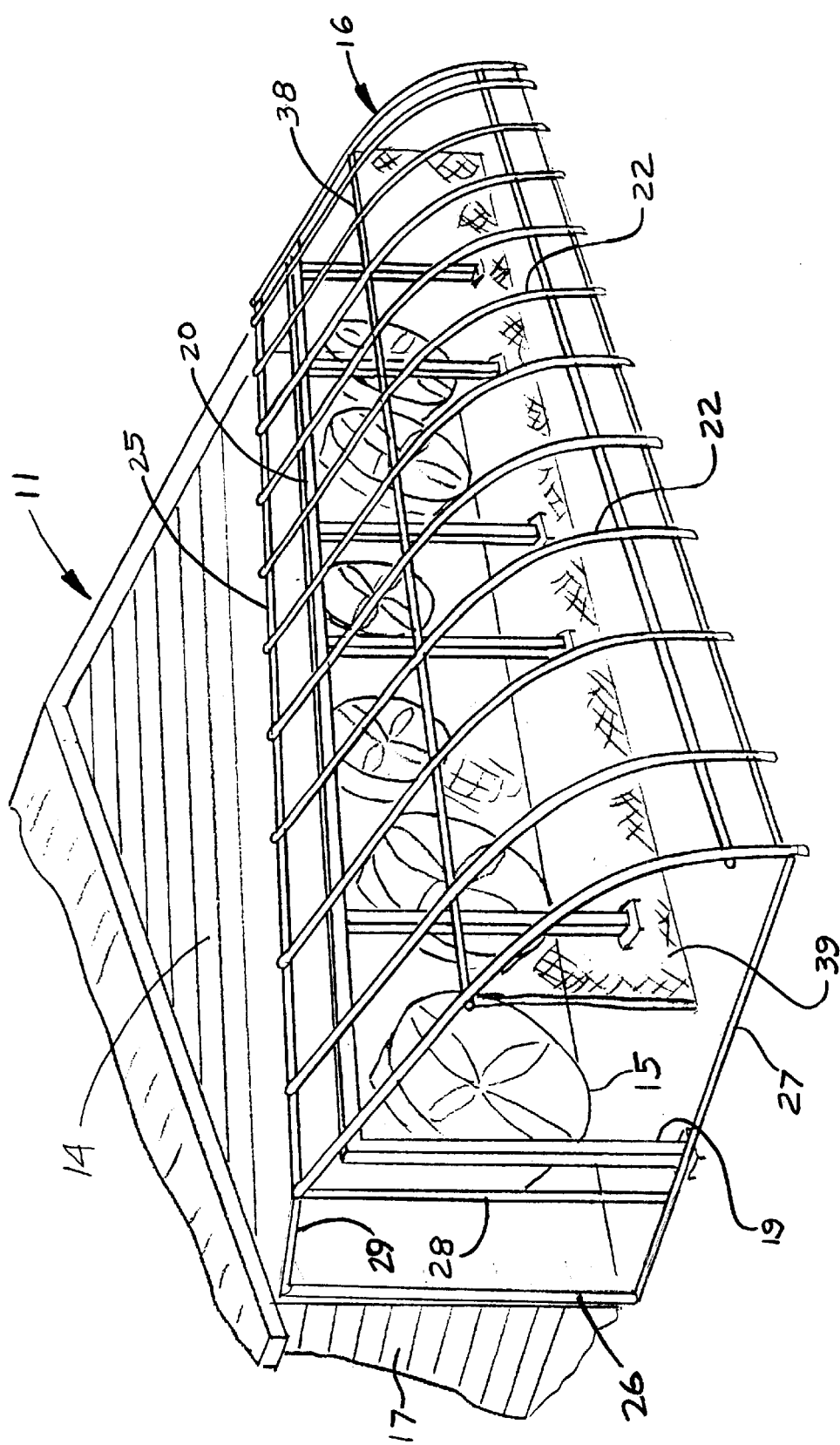
FIG. 5 is a perspective view of the livestock housing facility and air dust removal system somewhat similar to FIG. 1 but with the cover removed for purposes of illustration in order to show the framework.
Figure 6:
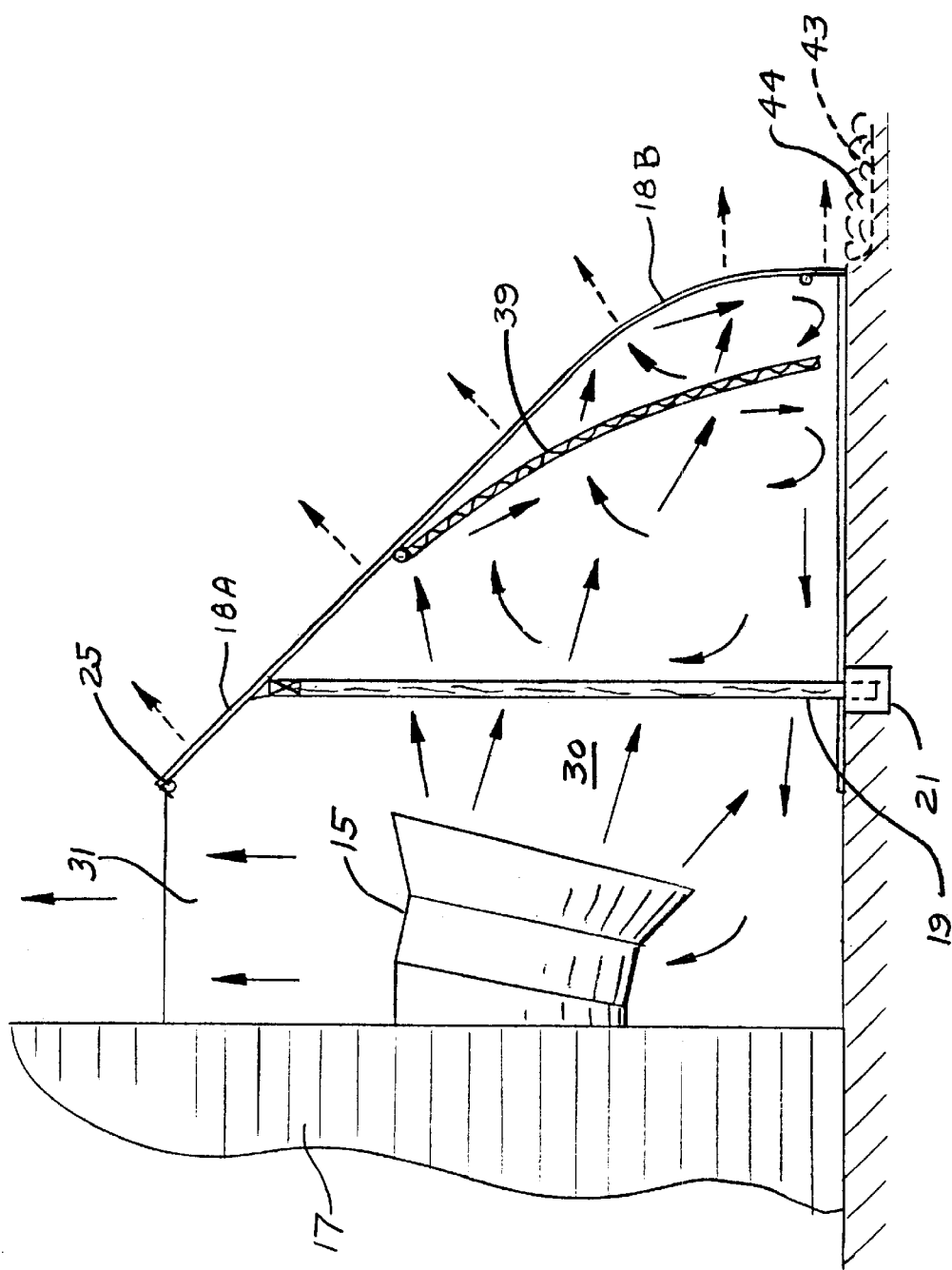
FIG. 6 is an enlarged sectional view of the installation shown in FIG. 2 taken along the line 6—6 thereof.

Referring to the drawings, there is shown in FIGS. 1 through 4 a livestock housing facility indicated generally at 10 including a confinement building 11 and an exhaust air dust removal system 12. Confinement building 11 houses a number of livestock (not shown). By the nature of quartering livestock, airborne odorous particulate material is generated which, for the comfort and well being of the animals, is best exhausted from the building 11, a process which will also cool the interior of the building when necessary. For this purpose, the building is equipped with a ventilation system which includes a plurality of electrically operated exhaust fans 15. Fans 15 are mounted in a horizontal row in exhaust openings located in one end wall 14 of building 11. Corresponding inlet openings (not shown) are located at other areas of the building.

The exhausted odorous airborne particulate material is preferably contained in the vicinity of the confinement building. This is accomplished by the air dust removal enclosure and system 12 which spans substantially the entire length of the end wall 14 with a vertical front opening in covering relationship to the exhaust fans 15.

The air dust removal enclosure and system 12 includes a stand alone framework 16 (FIG. 5), and a cover 18 installed on the framework. The framework 16 includes an upright support structure comprised of plurality of upright posts 19 arranged in a row parallel to the wall 14 of the building. Posts 19 are installed in the ground as with concrete anchors 21 (FIG. 6). The upper ends of the posts 19 are connected by a continuous overhead beam 20 parallel to and spaced from the wall 14. A hoop structure is formed by a plurality of parallel tubular poles 22 connected to the overhead beam 20.

Poles 22 slope downwardly away from the building wall 14. Poles 22 overlap or extend forward ahead of the overhead beam 20 toward the building wall 14 and end at an elevation above the fans 15 and spaced from the side 14 of building 11. A leading edge purlin 25 connects the upper ends of poles 22. Poles 22 curve toward the lower ends and end in vertical end sections secured to the ground.

Frame 16 further includes lower horizontal side support members 27 each connected at one end to an end tubular pole 22 and at the other end to a vertical post 26 located adjacent to the exterior wall 14. The upper ends of vertical support members 28 are connected to the leading edge purlin 25. Vertical support members 28 are horizontally spaced from the wall 14 of building 11. A strut 29 connects the upper end of the vertical support member 28 to the upper end of the vertical post 26.

Cover 18 has a top section 18A, a back section 18B that slopes downwardly from the top section to the ground, and side sections 18C that extend on the sides from the top section 18A to the ground (FIG. 1). The cover 18 is installed over the frame 16 in such a manner as to completely enclose the volume of space adjacent wall 14 with the exception of an upwardly open exhaust passage. Cover 18 forms an enclosed chamber 30 for collection and retention of airborne particulate material exhausted from the building 11. The upper forward edge of cover 18 is attached to leading edge purlin 25. An upwardly open outlet opening or discharge passage 31 is formed between leading edge purlin 25 and the side of wall 14. By way of example, purlin 25 can be spaced four feet from wall 14.

Cover 18 has side panels 33 that close the sides of chamber 30. As shown in FIGS. 1 and 3, a side panel 33 extends from the vertical support member 28 to the vertical post 26 located adjacent to the exterior wall 14.

Cover 18 is formed of an air permeable fabric that has characteristics of or is similar to a high strength woven synthetic material stabilized to resist degradation due to ultraviolet light exposure. The fabric has sufficient porosity such that, in conjunction with the discharge opening 31, there is no appreciable static pressure buildup in chamber 30 which could otherwise affect the efficiency or operation of the exhaust fans 15.

As shown in FIGS. 5 and 6, an intermediate purlin or rod 38 extends horizontally across frame 16 parallel to wall 14. Rod 38 can be fixed intermediately to the poles 22. An air dam or deflection curtain 39 is suspended from the rod 38. Rod 38 positions the curtain 39 in horizontal alignment with the exhaust outlets of the fans 15. Curtain 39 is formed of a porous, synthetic mesh material. Its purpose is to slow the air stream from the fans 15 and promote precipitation of airborne particulate material from the air stream.

A disposable floor mat 41 partially covers the ground surface encompassed by cover 18 to receive particulate material precipitated from the air stream. A ground flap 43 extends outward from the lower edge of cover 18. An aggregate 44 is piled on the flap 43 to hold it in place. Flap 43 seals enclosure 30 to prevent air flow leakage as well as to deter rodents.

In operation, air entrained with odor carrying particulate material is exhausted from the building 11 by the exhaust fans 15. The air stream enters the enclosure 30 defined by the cover 18. The air swirls around enclosure 30 in various directions and is directed toward the inclined expanse of the cover 18 (as shown by the solid arrows in FIG. 6). Much of the air stream first encounters the deflection curtain 39. Impaction upon the curtain 39 causes precipitation of some of the particulate material from the air stream. As air passes through the curtain, more particulate material is trapped. Air that moves through or past the curtain encounters the impaction surfaces presented by the slope of the cover 18, deflecting it toward the ground where it tends to stall in the area of the enclosure furthest from the fan. Particulate material will fall out of suspension at this point. The air stream, seeking a path of least resistance (and lowest pressure), reverses direction and exits out the opening in the top of the enclosure.

A portion of the air stream passes through the porous cover 18 (shown by arrows in phantom in FIG. 6) where additional airborne particulates are trapped by the fabric. Periodic rain events clean the fabric of entrained dust. Also periodically the floor mat can be cleaned or removed and replaced.

The embodiments of the invention in which an exclusive property or privilege is claimed are defined as follows:

1. A system for removal of airborne particulate material entrained in air exhausted through ventilation equipment of a livestock housing facility, comprising:

a livestock housing facility vertical wall with an interior side and an exterior side;

one or more ventilation fans installed in the wall with outlets on the exterior side of the wall for moving particulate entrained air from the interior side of the wall to the exterior side;

a frame standing next to the wall;

a porous fabric material cover covering the frame and forming an enclosed interior chamber encompassing a volume of space adjacent the wall and having a front opening open to the wall and edges sealed relative to the wall;

said chamber encompassing the ventilation fan outlets;

said cover having a top section with an opening forming a discharge opening for air from the chamber.

2. The system of claim 1 wherein:

said cover has surfaces inclined downwardly away from the wall in order to downwardly deflect air moving through the ventilation fan outlets.

3. The system of claim 2 wherein:

said top section of the cover has a leading edge spaced from the wall to form said discharge opening.

4. The system of claim 2 wherein:

said cover has a top section, a back section sloping downwardly from the top section to the ground, and side sections extending from the top section to the ground;

said side sections having forward panels connectable to enclose the sides of the enclosure system next to the exterior side of the livestock housing facility wall.

5. The system of claim 4 including:

a disposable ground mat covering the ground enclosed by the enclosure system.

6. The system of claim 4 including:

a transverse air permeable curtain suspended from the frame and extending substantially the length of the enclosure parallel to the front opening positioned to intercept air flow from the ventilation fan outlets.

7. The system of claim 4 wherein:

said cover fabric is a woven synthetic material.

8. The system of claim 2 wherein:

said frame includes a plurality of upright frame posts disposed in a row parallel to the wall;

an overhead beam connected to upper ends of the upright posts;

a plurality of curved inclined tubular frame poles connected near their upper ends to the overhead beam and overlapping it, said poles sloping downward from the overhead member in a direction outward from the wall, said frame poles ending in vertical end sections that can be secured to the ground.

9. The system of claim 8 including:

a leading edge purlin connected to the overlapping ends of the frame poles;

said top section of the cover having a leading edge connected to the leading edge purlin and spaced from the wall to form said exhaust passage from the chamber.

10. The system of claim 9 including:

a bottom perimeter flap connected to the cover along the bottom edge of the cover and extendable along the ground surface away from the frame;

an aggregate piled on the bottom perimeter flap to seal the bottom edge of the enclosure system.

11. The system of claim 9 including:

a transverse air permeable curtain suspended from the frame and extending substantially the length of the enclosure parallel to the front opening positioned to intercept air flow from the ventilation fan outlets.

12. The system of claim 2 including:

a transverse air permeable curtain suspended from the frame and extending substantially the length of the enclosure parallel to the front opening positioned to intercept air flow from the ventilation fan outlets.

13. The system of claim 12 wherein:

said frame includes a plurality of upright frame posts disposed in a row parallel to the wall;

an overhead beam connected to upper ends of the upright posts;

a plurality of curved inclined tubular frame poles connected near their upper ends to the overhead beam and overlapping it, said poles sloping downward from the overhead member in a direction outward from the wall, said frame poles ending in vertical end sections that can be secured to the ground.

14. The system of claim 13 wherein:

said cover fabric is a geotextile material.

15. The system of claim 13 including:

a leading edge purlin connected to the overlapping ends of the frame poles;

said top section of the cover having a leading edge connected to the leading edge purlin and spaced from the wall to form said exhaust passage from the chamber.

16. An enclosure system for control of airborne particulate material exhausted by ventilation fan equipment through ventilation fan outlets mounted in a wall of a livestock housing facility, comprising:

a frame that can be located next to a wall of a livestock housing facility having one or more exhaust fans mounted in the wall to move particulate entrained air through ventilation fan outlets from the interior of the housing facility to the exterior of the housing facility;

a porous fabric material cover covering the frame forming an enclosed interior chamber with a vertical front opening, that can encompass a volume of space adjacent a livestock housing facility wall inclusive of ventilation fan outlets providing a settling chamber for airborne particulates entrained in air exhausted from the livestock housing facility;

said frame positionable against the facility wall so that edges of the cover can engage the facility wall in substantially sealing relationship;

an upwardly open exhaust opening in the cover for exhaust of air from the settling chamber;

said cover having downwardly inclined surfaces intended to downwardly deflect air flow from the ventilation outlets to promote precipitation of particulate material from the air flow.

17. The enclosure system of claim 16 including:

a transverse air permeable curtain suspended from the frame and extending substantially the length of the enclosure parallel to the front opening positioned to intercept air flow from the ventilation fan outlets.

18. The enclosure system of claim 17 wherein:

said cover has a top section, a back section sloping downwardly from the top section to the ground, and side sections extending from the top section to the ground;

said side sections having forward panels connectable next to a livestock housing facility in order to enclose the sides of the enclosure system.

19. The enclosure system of claim 18 wherein:

said frame includes a plurality of upright frame posts disposed in a row parallel to the wall;

an overhead beam connected to upper ends of the upright posts;

a plurality of curved inclined tubular frame poles connected near their upper ends to the overhead beam and overlapping it, said poles sloping downward from the overhead member in a direction outward from the wall, said frame poles ending in vertical end sections that can be secured to the ground.

20. The enclosure system of claim 19 including:
a leading edge purlin connected to the overlapping ends of the frame poles;
   said top section of the cover having a leading edge connected to the leading edge purlin and spaced from the wall to form said exhaust passage from the chamber.

21. The enclosure system of claim 20 including:
a disposable ground mat covering the ground enclosed by the enclosure system.

22. The enclosure system of claim 18 wherein:
said cover fabric is a woven synthetic material.

* * * * *